(12) United States Patent
Aklilu et al.

(10) Patent No.: US 7,017,052 B2
(45) Date of Patent: Mar. 21, 2006

(54) METHOD AND SYSTEM FOR REDUCING BOOT TIME FOR A COMPUTER

(75) Inventors: Ameha Aklilu, Chapel Hill, NC (US); Kamran Amini, Cary, NC (US); Jordan Hsiao Ping Chin, Cary, NC (US); James Alexander Day, Jr., Durham, NC (US); Chad Lee Gettelfinger, Durham, NC (US); Eric Richard Kern, Durham, NC (US)

(73) Assignee: Lenovo Pte. Ltd., Singapore (SG)

( * ) Notice: Subject to any disclaimer, the term of this patent is extended or adjusted under 35 U.S.C. 154(b) by 653 days.

(21) Appl. No.: 09/990,823

(22) Filed: Nov. 16, 2001

(65) Prior Publication Data

US 2003/0097598 A1  May 22, 2003

(51) Int. Cl.
*G06F 1/26* (2006.01)

(52) U.S. Cl. .................. 713/300; 713/310; 713/320; 717/120; 717/121; 719/318; 719/328

(58) Field of Classification Search .................. 713/1, 713/2, 100, 300, 320, 323, 324, 330, 310; 717/120, 121; 719/318, 328
See application file for complete search history.

(56) References Cited

U.S. PATENT DOCUMENTS

| 5,345,424 | A | | 9/1994 | Landgraf |
| 5,692,197 | A | | 11/1997 | Narad et al. |
| 5,878,264 | A | * | 3/1999 | Ebrahim .................. 713/323 |
| 6,035,374 | A | | 3/2000 | Panwar et al. |
| 6,058,466 | A | | 5/2000 | Panwar et al. |
| 6,098,158 | A | * | 8/2000 | Lay et al. .................. 711/162 |
| 6,101,608 | A | | 8/2000 | Schmidt et al. |
| 6,125,449 | A | * | 9/2000 | Taylor et al. ............... 713/310 |
| 6,230,274 | B1 | * | 5/2001 | Stevens et al. ............ 713/320 |
| 6,249,739 | B1 | * | 6/2001 | Noehring et al. .......... 701/113 |
| 6,266,776 | B1 | * | 7/2001 | Sakai ........................ 713/300 |
| 6,360,327 | B1 | * | 3/2002 | Hobson ..................... 713/300 |
| 6,434,696 | B1 | * | 8/2002 | Kang ............................ 713/2 |
| 6,438,708 | B1 | * | 8/2002 | Shinichi et al. .............. 714/15 |
| 6,446,213 | B1 | * | 9/2002 | Yamaki ..................... 713/300 |
| 6,499,102 | B1 | * | 12/2002 | Ewertz ......................... 713/1 |
| 6,522,133 | B1 | * | 2/2003 | Haupt et al. .......... 324/207.22 |
| 6,636,963 | B1 | * | 10/2003 | Stein et al. .................... 713/1 |
| 6,678,831 | B1 | * | 1/2004 | Mustafa et al. ............ 713/320 |
| 6,691,234 | B1 | * | 2/2004 | Huff ........................... 713/300 |
| 6,721,885 | B1 | * | 4/2004 | Freeman et al. .............. 713/2 |
| 6,725,384 | B1 | * | 4/2004 | Lambino et al. ........... 713/320 |
| 6,732,264 | B1 | * | 5/2004 | Sun et al. ...................... 713/2 |

(Continued)

*Primary Examiner*—Lynne H. Browne
*Assistant Examiner*—Nitin C. Patel
(74) *Attorney, Agent, or Firm*—Sawyer Law Group LLP

(57) ABSTRACT

A method for reducing the boot time for a computer includes: supplying power to the computer; disabling a plurality of input/output (I/O) devices coupled to the computer; performing a boot process for the computer; and placing the computer in a suspend to memory state before a user turns on the computer. The method reduces the boot time for a computer by placing the computer in a suspend to memory mode rather than completely shutting off the computer. In this manner, when a user of the computer pushes the power button, the computer wakes up from the suspend to memory mode instead of being required to perform the entire boot process. This significantly reduces the time required to make the computer available to the user, allowing the computer to function like an appliance.

23 Claims, 3 Drawing Sheets

U.S. PATENT DOCUMENTS

| | | | |
|---|---|---|---|
| 6,760,850 B1 * | 7/2004 | Atkinson et al. | 713/320 |
| 6,775,784 B1 * | 8/2004 | Park | 713/320 |
| 6,938,175 B1 * | 8/2005 | Lee | 713/320 |
| 2001/0016918 A1 * | 8/2001 | Alexander et al. | 713/323 |
| 2001/0039612 A1 * | 11/2001 | Lee | 713/2 |
| 2002/0038328 A1 * | 3/2002 | Morisawa | 709/1 |
| 2003/0188212 A1 * | 10/2003 | Kahn et al. | 713/323 |
| 2004/0098578 A1 * | 5/2004 | Funayama | 713/2 |

* cited by examiner

METHOD AND SYSTEM FOR REDUCING BOOT TIME FOR A COMPUTER

FIELD OF THE INVENTION

The present invention relates to computers, and more particularly to the boot process of computers.

BACKGROUND OF THE INVENTION

Currently, there is a trend in the industry to decrease the time required to boot a computer. Typically, once a user of the computer presses a power button to turn on the computer, there is a time period of several seconds between the time the power button is pressed and the operating system is completely up and functional. Current computer systems have reduced this time to about 35 seconds. However, this length of time is still an obstacle in mainstreaming or appliancing the computer.

Accordingly, there exists a need for a method and system for reducing the boot time for a computer. The method and system should reduce the boot time enough that the computer is available for use within a time similar to an appliance. The present invention addresses such a need.

SUMMARY OF THE INVENTION

A method for reducing the boot time for a computer includes: supplying power to the computer; disabling a plurality of input/output (I/O) devices coupled to the computer; performing a boot process for the computer; and placing the computer in a suspend to memory state before a user turns on the computer. The method reduces the boot time for a computer by placing the computer in a suspend to memory mode rather than completely shutting off the computer. In this manner, when a user of the computer pushes the power button, the computer wakes up from the suspend to memory mode instead of being required to perform the entire boot process. This significantly reduces the time required to make the computer available to the user, allowing the computer to function like an appliance.

DETAILED DESCRIPTION

The present invention provides a method and system for reducing the boot time for a computer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention reduces the boot time for a computer by placing the computer in a suspend to memory mode rather than completely shutting off the computer. In the manner, when a user of the computer pushes the power button, the computer wakes up from the suspend to memory mode instead of being required to perform the entire boot process. This significantly reduces the time required to make the computer available to the user, allowing the computer to function like an appliance.

To more particularly describe the features of the present invention, please refer to FIGS. 1 through 3 in conjunction with the discussion below.

Figure 1:
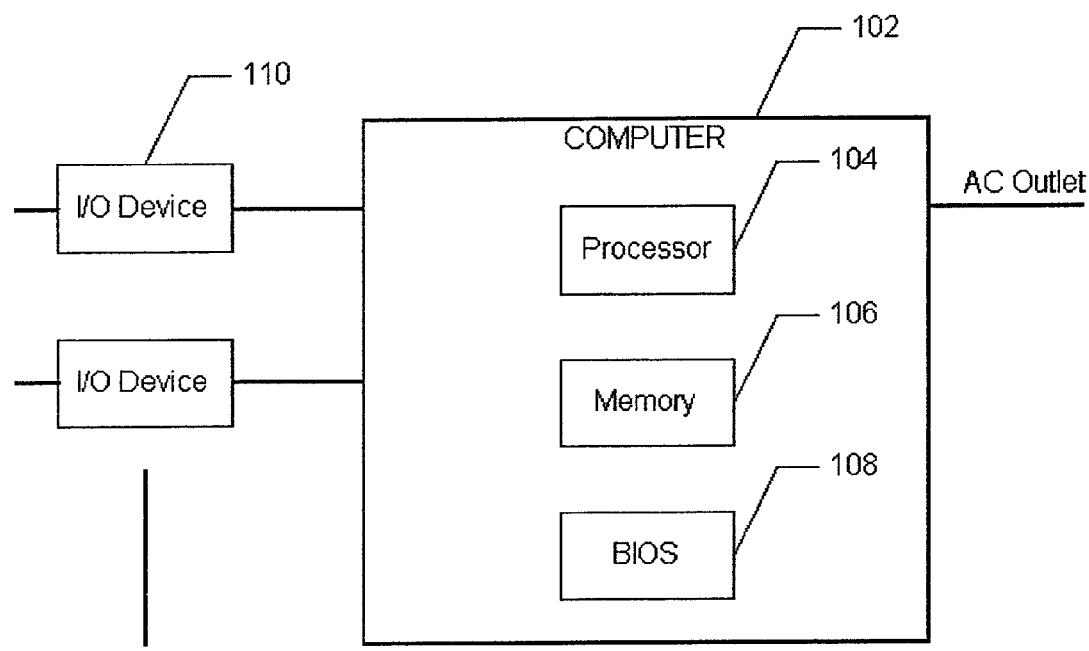
FIG. 1 illustrates a preferred embodiment of a system for reducing the boot time for a computer in accordance with the present invention.

FIG. 1 illustrates a preferred embodiment of a system for reducing the boot time for a computer in accordance with the present invention. The system comprises a computer 102 with a processor 104, memory 106, and a Basic Input/Output System (BIOS) 108. The memory 106 is a volatile memory, such as random access memory (RAM), and the BIOS 108 is stored in a static, read-only memory, such as an Electrically Erasable Programmable Read-Only Memory (EEPROM). The computer 102 is supplied power typically from an AC outlet. Coupled to the computer 102 are a plurality of input/output (I/O) devices 110, such as a monitor, keyboard, and mouse. The method in accordance with the present invention is implemented by code stored in the BIOS 108.

Figure 2:
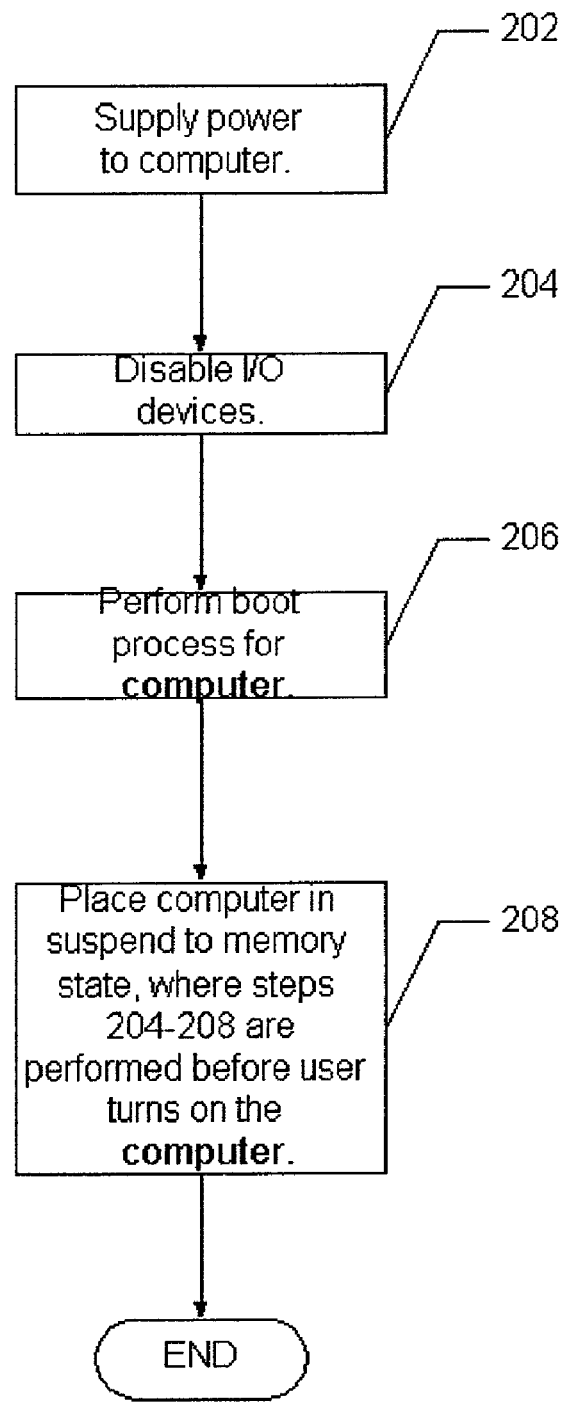
FIG. 2 is a flowchart illustrating a preferred embodiment of a method for reducing the boot time for a computer in accordance with the present invention.

FIG. 2 is a flowchart illustrating a preferred embodiment of a method for reducing the boot time for a computer in accordance with the present invention. First, power is supplied to the computer 102, via step 202. Assume that the computer 102 is plugged into the AC outlet for the first time. When the computer 102 is plugged in, it is supplied power, via step 202. The next steps 204–208 are then performed before the user turns on the computer 102. The BIOS 108 first disables the I/O devices 110 coupled to the computer 102, via step 204. The BIOS 108 then performs the boot process for the computer, via step 206. Because the I/O devices 110 are disabled, the user of the computer 102 is not aware of this boot process. Once fully booted, the BIOS 108 places the computer 102 in a suspend to memory state, via step 208.

In the preferred embodiment, the suspend to memory state is a conventional S3 state, where the contents of the computer 102 are saved to memory 104. When the user turns "on" the computer 102, typically by pressing the power button, the computer 102 is woken up from the suspend to memory state. The computer 102 becomes available significantly faster than if it had to perform the entire boot process. Each time the user turns "off" the computer 102, again typically by pressing the power button, the computer 102 is returned to the suspend to memory state rather than actually powered down. To the user, the functioning of the computer 102 does not appear any different than if the computer 102 performed the boot process each time it is turned on, or if it was actually powered down each time it is turned off, except the time within which the computer 102 becomes available when it is turned on is significantly faster. The time it takes for the computer 102 to wake up from the suspend to memory state is typically within a few seconds, allowing the computer 102 to function like an appliance.

Figure 3:
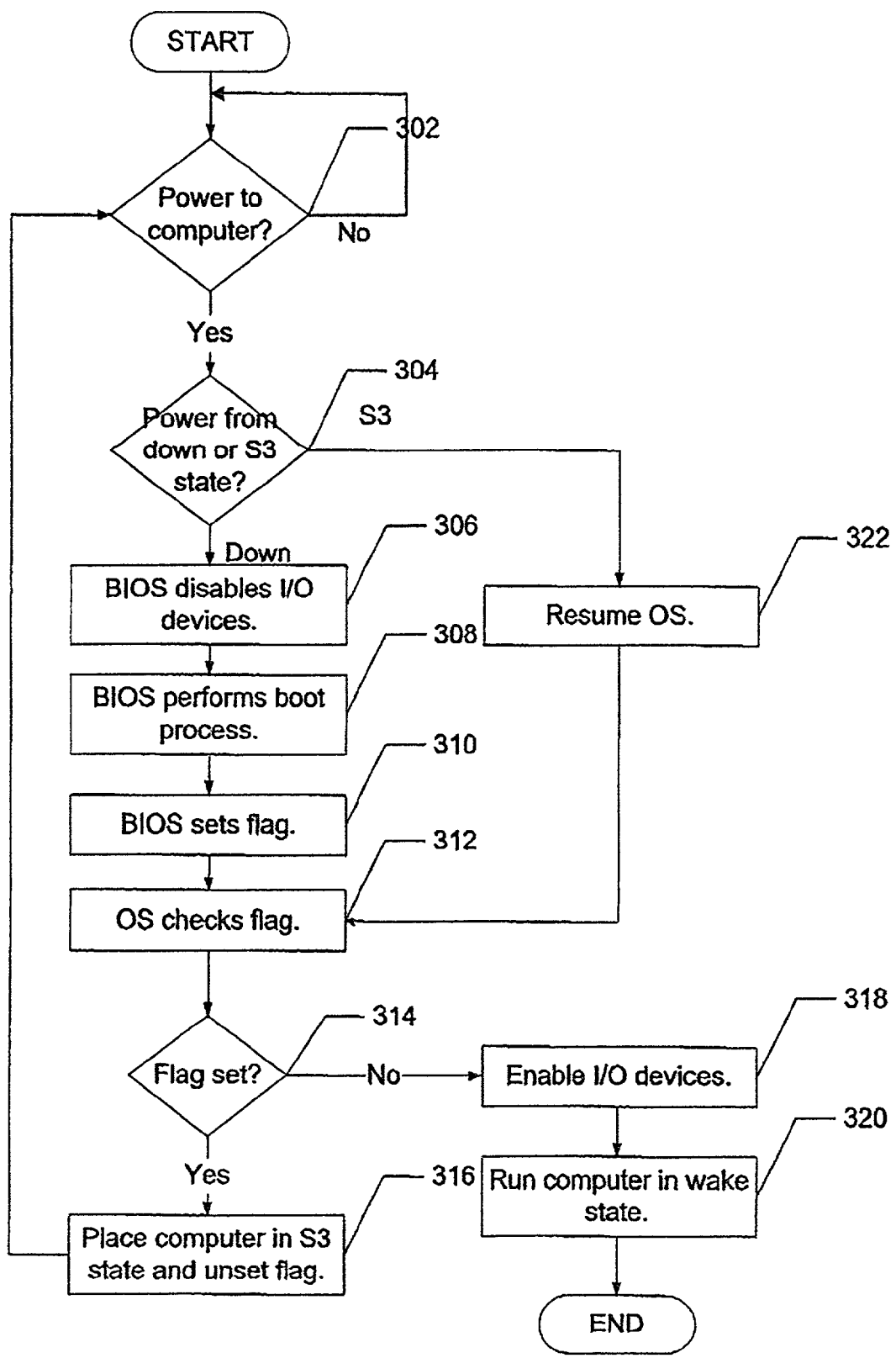
FIG. 3 is a flowchart illustrating in more detail the method for reducing the boot time for a computer in accordance with the present invention.

FIG. 3 is a flowchart illustrating in more detail the method for reducing the boot time for a computer in accordance with the present invention. First, power is supplied to the computer 102, via step 302. In the preferred embodiment, this occurs either when the computer 102 first receives power from an AC outlet (such as when the computer 102 is first set up or after a power failure), or when the user pressed the power button to turn the computer 102 "on". The BIOS determines if the power is being supplied with the computer 102 being in a powered down state or in an S3 state, via step 304. If the power is being supplied with the computer 102 being in a powered down state, then the BIOS 108 disables the I/O devices 110 coupled to the computer 102, via step 306. The BIOS 108 then performs the boot process, via step 308. It also sets a flag, via step 310, to indicate that the computer 102 is booting from a powered down state. In the preferred embodiment, the flag is one or more of the chip set registers (not shown). Control of the computer 102 is then handed off to the operating system (OS) of the computer 102. The OS checks the flag, via step 312. If the flag is set, via step 314, then the OS places the computer 102 is the S3 state, via step 316, and unsets the flag. The computer 102 then waits to be supplied power, via step 302.

If the BIOS 108 determines that power is being supplied with the computer 102 being in the S3 state, via step 304, then the OS resumes operation, via step 322. The OS then checks the flag, via step 312. Since the flag was unset during a previous boot up from a powered down state, the OS, through the BIOS 108, enables the I/O devices 110, via step 318. The computer 102 is then run in the wake state, via step 320. The computer 102 continues to operate in the wake state until power is denied to the computer 102, either from the user pressing the power button to turn the computer 102 "off", or from the computer 102 no longer receiving power from the AC outlet. If the user presses the power button to turn the computer 102 "off", then the computer 102 is returned to the S3 state. If the computer 102 no longer receives power from the AC outlet, then it is returned to the powered down state. The method in accordance with the present invention then returns to step 302.

A method and system for reducing the boot time for a computer has been disclosed. The method and system in accordance with the present invention reduces the boot time for a computer by placing the computer in a suspend to memory mode rather than completely shutting off the computer. In this manner, when a user of the computer pushes the power button, the computer wakes up from the suspend to memory mode instead of being required to perform the entire boot process. This significantly reduces the time required to make the computer available to the user, allowing the computer to function like an appliance.

Although the present invention has been described in accordance with the embodiments shown, one of ordinary skill in the art will readily recognize that there could be variations to the embodiments and those variations would be within the spirit and scope of the present invention. Accordingly many modifications may be made by one of ordinary skill in the art without departing from the spirit and scope of the appended claims.

What is claimed is:

1. A method for reducing a boot time for a computer, comprising:
  (a) supplying power to the computer when the computer is in a powered down state;
  (b) disabling a plurality of input/output (I/O) devices coupled to the computer;
  (c) performing a boot process for the computer, comprising setting a flag by a basic input/output system (BIOS) of the computer, wherein setting the flag indicates that the computer is being booted from a powered down state; and
  (d) placing the computer in a suspend to memory state, wherein the steps (a) through (d) are performed before a user turns on the computer, wherein the placing comprises:
    (d1) checking the flag by an operating system (OS) of the computer, wherein the flag indicates whether or not the computer is being booted from the powered down state, and
    (d2) placing the computer in the suspend to memory state if the flag indicates that the computer is being booted from the powered down state.

2. The method of claim 1, wherein the supplying (a) comprises:
  (a1) supplying power to the computer by plugging the computer into an AC outlet.

3. The method of claim 1, wherein the flag comprises at least one chip set register.

4. The method of claim 1, wherein the suspend to memory state is an S3 state.

5. The method of claim 1, further comprising:
  (e) supplying power to the computer when the computer is in the suspend to memory state;
  (f) resuming operation of an OS of the computer;
  (g) checking the flag by the OS, wherein the flag indicates whether or not the computer is being booted from the powered down state;
  (h) enabling the plurality of I/O devices if the flag indicates that the computer is not being booted from the powered down state; and
  (i) operating the computer in a wake state.

6. The method of claim 5, further comprising:
  (j) returning the computer to the suspend to memory state if the computer is being turned "off".

7. The method of claim 6, wherein the returning step (j) comprises:
  (j1) returning the computer to the suspend to memory state if a power button of the computer is pressed.

8. A method for reducing the boot time for a computer, comprising:
  (a) supplying power to the computer;
  (b) determining if the power is supplied to the computer when a computer is in a powered down state or a suspend to memory state;
  (c) booting the computer when the power is supplied to the computer when the computer is in a powered down state, wherein the booting step (c) comprises:
    (c1) disabling a plurality of I/O devices coupled to the computer,
    (c2) performing a boot process for the computer, comprising setting a flag by a BIOS of the computer, wherein the flag indicates whether or not the computer is being booted from the powered down state, and
    (c3) placing the computer in the suspend to memory state, wherein (c1) through (c3) are performed before a user turns on the computer, wherein the placing is performed by an OS of the computer, wherein the placing comprises:
      (c3i) checking the flag by the OS, wherein the flag indicates whether or not the computer is being booted from the powered down state, and
      (c3ii) placing the computer in the suspend to memory state if the flag indicates that the computer is being booted from the powered down state; and (d) operating the computer in a wake state if the power is supplied to the computer when the computer is in the suspend to memory state.

9. The method of claim 8, wherein the flag comprises at least one chip set register.

10. The method of claim 8, wherein the operating (d) comprises:
(d1) resuming operation of an OS of the computer;
(d2) checking the flag by the OS, wherein the flag indicates whether or not the computer is being booted from the powered down state;
(d3) enabling the plurality of I/O devices if the flag indicates that the computer is not being booted from the powered down state; and
(d4) operating the computer in the wake state.

11. The method of claim 8, further comprising:
(e) returning the computer to the suspend to memory state if a power button of the computer is pressed.

12. A computer readable medium with program instructions for reducing a boot time for a computer, comprising the instructions for:
(a) supplying power to the computer when the computer is in a powered down state;
(b) disabling a plurality of I/O devices coupled to the computer;
(c) performing a boot process for the computer, comprising setting a flag by a basic input/output system (BIOS) of the computer, wherein setting the flag indicates that the computer is being booted from a powered down state; and
(d) placing the computer in a suspend to memory state, wherein the instructions (a) through (d) are performed before a user turns on the computer, wherein the placing comprises:
(d1) checking the flag by an operating system (OS) of the computer, wherein the flag indicates whether or not the computer is being booted from the powered down state, and
(d2) placing the computer in the suspend to memory state if the flag indicates that the computer is being booted from the powered down state.

13. The medium of claim 12, wherein the supplying instruction (a1) comprises instructions for:
(a1i) supplying power to the computer by plugging the computer into an AC outlet.

14. The medium of claim 12, wherein the flag comprises at least one chip set register.

15. The medium of claim 12, wherein the suspend to memory state is an S3 state.

16. The medium of claim 12, further comprising instructions for:
(e) supplying power to the computer when the computer is in the suspend to memory state;
(f) resuming operation of an OS of the computer;
(g) checking the flag by the OS, wherein the flag indicates whether or not the computer is being booted from the powered down state;
(h) enabling the plurality of I/O devices if the flag indicates that the computer is not being booted from the powered down state; and
(i) operating the computer in a wake state.

17. The medium of claim 16, further comprising instructions for:
(j) returning the computer to the suspend to memory state if the computer is being turned "off".

18. The medium of claim 17, wherein the returning instruction (j) comprises instructions for:
(j1) returning the computer to the suspend to memory state if a power button of the computer is pressed.

19. A computer readable medium with program instructions for reducing a boot time for a computer, comprising the instructions for:
(a) supplying power to the computer;
(b) determining if the power is supplied to the computer when the computer is in a powered down state or a suspend to memory state;
(c) booting the computer when the power is supplied to the computer when the computer is in a powered down state, wherein the booting instruction (c) comprises instructions for:
(c1) disabling a plurality of I/O devices coupled to the computer,
(c2) performing a boot process for the computer, comprising setting a flag by a BIOS of the computer, wherein the flag indicates whether or not the computer is being booted from the powered down state, and
(c3) placing the computer in the suspend to memory state, wherein the instructions (c1) through (c3) are performed before a user turns on the computer, wherein the placing is performed by an OS of the computer, wherein the placing comprises:
(c3i) checking the flag by the OS, wherein the flag indicates whether or not the computer is being booted from the powered down state, and
(c3ii) placing the computer in the suspend to memory state if the flag indicates that the computer is being booted from the powered down state; and
(d) operating the computer in a wake state if the power is supplied to the computer when the computer is in the suspend to memory state.

20. The medium of claim 19, wherein the flag comprises at least one chip set register.

21. The medium of claim 19, wherein the operating instruction (d) comprises instructions for:
(d1) resuming operation of an OS of the computer;
(d2) checking the flag by the OS, wherein the flag indicates whether or not the computer is being booted from the powered down state;
(d3) enabling the plurality of I/O devices if the flag indicates that the computer is not being booted from the powered down state; and
(d4) operating the computer in the wake state.

22. The medium of claim 19, further comprising instructions for:
(e) returning the computer to the suspend to memory state if a power button of the computer is pressed.

23. A system, comprising:
a plurality of I/O devices; and
a computer coupled to the plurality of I/O devices, the computer comprising:
a BIOS,
a memory,
an OS, wherein when power is supplied to the computer when the computer is in a powered down state before a user turns on the computer, the BIOS disables the plurality of I/O devices and performs a boot process for the computer, and the OS places the computer in a suspend to memory state, and
a register, wherein a state of the register indicates whether or not the computer is being supplied power with the computer being in a powered down state or the suspend to memory state, wherein if the register indicates that the computer is being supplied power with the computer being in a powered down state, then the OS places the computer in the suspend to memory state, wherein if the register indicates that the computer is being supplied power with the computer being in the suspend to memory state, then the OS operates the computer in a wake state.

* * * * *

UNITED STATES PATENT AND TRADEMARK OFFICE
CERTIFICATE OF CORRECTION

PATENT NO. : 7,017,052 B2  Page 1 of 1
DATED : March 21, 2006
INVENTOR(S) : Aklilu et al.

It is certified that error appears in the above-identified patent and that said Letters Patent is hereby corrected as shown below:

<u>Column 4,</u>
Line 38, after "reducing" and before "boot" delete "the" and replace with -- a --.
Line 42, after "when" and before "computer" delete "a" and replace with -- the --.

Signed and Sealed this

Sixth Day of June, 2006

JON W. DUDAS
*Director of the United States Patent and Trademark Office*